O. H. BUTLER.
PARING KNIFE.
APPLICATION FILED APR. 9, 1914.
1,133,228.
Patented Mar. 23, 1915.
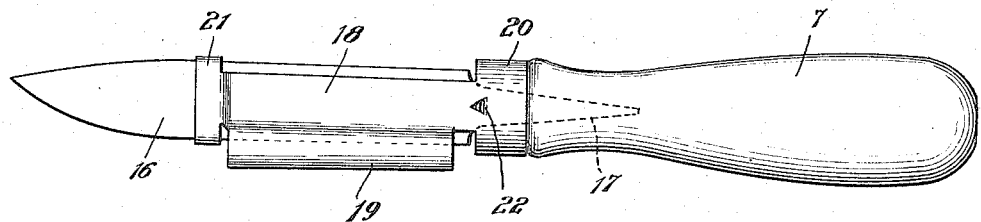
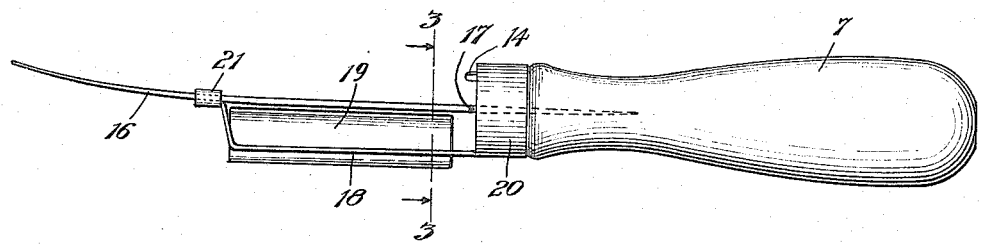
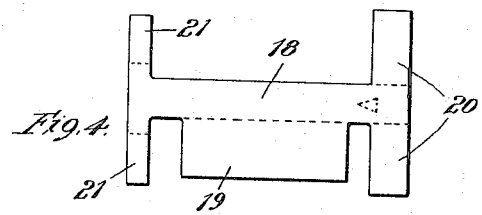
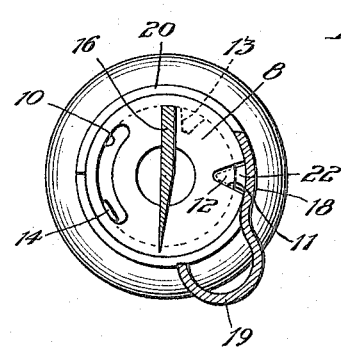
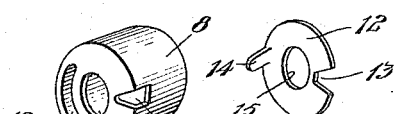
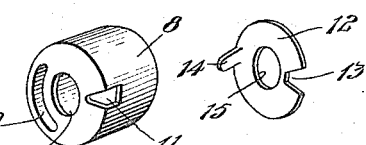
Witnesses:
A. J. Bull.
B. G. Richards
Inventor
Ossie H. Butler,
by Joshua R. H. Potts
his Attorney

UNITED STATES PATENT OFFICE.

OSSIE H. BUTLER, OF CHICAGO, ILLINOIS.

PARING-KNIFE.

1,133,228.

Specification of Letters Patent.  Patented Mar. 23, 1915.

Application filed April 9, 1914. Serial No. 830,680.

*To all whom it may concern:*

Be it known that I, OSSIE H. BUTLER, a citizen of the United States, and a resident of the city of Chicago, county of Cook, and State of Illinois, have invented certain new and useful Improvements in Paring-Knives, of which the following is a specification.

My invention relates to improvements in paring knives and has for its object the provision of an improved knife of this character which is of simple construction and efficient in use.

The invention consists in the combinations and arrangements of parts hereinafter described and claimed.

The invention will be best understood by reference to the accompanying drawing forming a part of this specification, and in which—

Figure 1 is a side view of a paring knife embodying my invention, Fig. 2, an edge view of the same, Fig. 3, an enlarged section taken on line 3—3 of Fig. 2, Fig. 4, a plan view of a blank from which the knife blade guard is made, Fig. 5, a perspective view of a cap fitting over the end of the knife handle, and Fig. 6, a perspective view of a locking disk arranged within said cap.

The preferred form of construction as illustrated in the drawing comprises an ordinary wooden handle 7 having a cap 8 secured over the end thereof, said cap 8 being provided in its outer face with a central circular opening 9 and a laterally positioned segmental slot 10 and at one of its outer edges with a notch 11 as indicated in Fig. 5. A locking disk 12 is arranged within cap 8 and is provided with a peripheral notch 13 adapted to register with notch 11, a projection 14 adapted to project through slot 10 and a central opening 15 adapted to register with opening 9. The knife blade 16 is provided with a reduced stem 17 adapted to pass through openings 9 and 15 and enter handle 7 as indicated, said knife blade being curved and sharpened as shown. A knife guard made of a blank 18 of sheet metal bent into form, said blank being provided at one side with a projection 19 shaped as shown in Fig. 3 to constitute the paring and slicing guard for the blade 16. Said blank is also provided at one end with oppositely extending loops 20 which are bent to form a ferrule adapted to fit snugly over cap 8 and at its other end with oppositely projecting loops 21 bent to form a loop adapted to fit snugly over the blade 16 as shown. The blank 18 is also provided with an inwardly extending triangular projection 22 curved therefrom and adapted to fit within notch 11 and to pass through notch 13. By this arrangement it will be observed that the guard may be readily slipped over the knife blade and placed in position with projection 22 passing through notch 11 under disk 12. By rotating disk 12 by means of projection 14 the disk is brought over projection 22 to lock the guard securely in place. When it is desired to remove the guard, the disk is rotated until notch 13 comes in registration with notch 11 and projection 22 when the guard may be readily slipped off over the blade. The specific arrangement of parts is a simple and efficient one for the purpose.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a knife blade and a handle therefor, of a guard for said blade, said guard being provided at one end with a loop fitting over said handle and at the other end with a loop fitting over said blade; and means on said handle for detachably securing the corresponding loop, substantially as described.

2. The combination of a handle; a blade secured thereto; a cap over one end of said handle, said cap being provided with a slot and at one outer edge with a notch; a guard for said blade having a ferrule fitting over said cap and a loop fitting over said blade; a projection on said guard fitting in said notch; a disk in said cap provided with a notch arranged to register with said cap notch; and a projection on said disk projecting through said slot, substantially as described.

In testimony whereof I have signed my name to this specification in the presence of two subscribing witnesses.

OSSIE H. BUTLER.

Witnesses:
JOSHUA R. H. POTTS,
ARTHUR A. OLSON.

Copies of this patent may be obtained for five cents each, by addressing the "Commissioner of Patents, Washington, D. C."